United States Patent [19]
St. Jean et al.

[11] Patent Number: 5,976,720
[45] Date of Patent: Nov. 2, 1999

[54] SHORT CIRCUIT AND OVERCHARGE PROTECTED BATTERY PACK

[75] Inventors: David L. St. Jean, Chepachet; John A. Navakauskas, Exeter, both of R.I.

[73] Assignee: Comtec Information Systems Inc, Warwick, R.I.

[21] Appl. No.: 08/874,172

[22] Filed: Jun. 13, 1997

[51] Int. Cl.⁶ .................................................. H01M 10/48
[52] U.S. Cl. ................. 429/7; 429/62; 29/623.2
[58] Field of Search ................... 429/7, 62, 96, 429/97, 99, 61; 320/134, 136, 154; 29/623.2, 623.4

[56] References Cited

U.S. PATENT DOCUMENTS

| | | | |
|---|---|---|---|
| 5,150,033 | 9/1992 | Conway | 429/7 X |
| 5,496,654 | 3/1996 | Perkins | 429/7 X |
| 5,689,173 | 11/1997 | Oosaki et al. | 429/62 X |

OTHER PUBLICATIONS

PolySwitch, PolySwitch RUE, R–Line PTC Overcurrent Protection (Date Unknown).

*Primary Examiner*—Stephen Kalafut
*Attorney, Agent, or Firm*—Harris Beach & Wilcox, LLP.

[57] ABSTRACT

A battery pack having an electrical circuit including a battery array of one or more batteries, a thermostat switch, and a positive temperature coefficient resistor (PTCR). Preferably, the thermostat and PTCR are disposed in a trianguloid channel formed by the nip of adjacent cylindrical batteries in a multiple battery pack so that the finished pack may have the same size and shape as a non-protected pack for the same application. Preferably, the batteries are rechargeable and the pack includes a charging plug connected across the battery array in series with the thermostat and PTCR. Preferably, the pack is wrapped in a film of a heat-shrinkable polymer to provide physical integrity.

11 Claims, 2 Drawing Sheets

5,976,720

SHORT CIRCUIT AND OVERCHARGE PROTECTED BATTERY PACK

DESCRIPTION

The present invention relates to apparatus for sensing and interrupting an electrical short circuit, more particularly to apparatus for sensing and interrupting an electrical short circuit in a direct current battery circuit, and most particularly to apparatus for sensing and interrupting an electrical short circuit and/or thermal overload in a rechargeable battery pack.

A wide range of electric tools, toys, vehicles, and appliances today are powered by one or more batteries. In many applications, for example those requiring deep cycle service or high levels of power output repeated at relatively short intervals, rechargeable batteries are an economical choice. Indeed, many devices are provided by their manufacturers with battery packs, of which some may be recharged in the device when time permits between uses, such as in an electric shaver, while others may be removed for external recharge at a charging station when the device must be continued in service with a charged replacement pack, such as in an electric drill or a printer. Such replaceable packs may be assembled in a variety of ways from individual battery components, for example, by holding the components in proper relationship in a mold and then casting a cross-linkable resin around them, or by holding the components in a suitable jig and then wrapping a heat-shrinkable polymer film around them.

Battery charging stations and battery powered devices may be provided in their circuitry with a thermal switch, or thermostat, which will open to break the circuit if the current draw through the switch exceeds a desired level and creates a thermal overload on the wiring, such as can happen in a charger if the charger fails to decrease the applied current as charging progresses and instead provides a constant current. Thermostats typically are relatively slow to respond and therefore are not optimum for protecting circuits which may be subjected to inadvertent very high current surges or short circuits. Instead or in addition, fast-acting protectors similar to lightning arrestors and ground fault circuit interrupters (GFIC's) are needed. Such protectors may include solid state components which can be responsive to greatly reduce or interrupt current flow in as little as a few milliseconds.

A shortcoming of the rechargeable battery art is that short circuit and overcharge protectors heretofore have been provided only to the charging stations and the user devices themselves, but not to removable battery packs. Thus, if the terminals in a charging port of a rechargeable battery pack are shorted while the pack is absent from either a charging station of a user device, as may happen through mishandling, inadvertence, or mischief, the pack may be damaged beyond recovery or may even explode or otherwise endanger personnel in the vicinity. A further shortcoming of rechargeable battery art is that rechargeable battery packs with integral charging jacks may catastophically fail if a short or overcharging condition occurs at the charger jack. In addition, some electrical devices that experience high current surges are unable to tolerate voltage drops across the battery protection circuit.

It is a principal object of the invention to provide an improved rechargeable battery pack wherein the components are protected from damage due to shorting and/or thermal overload of the circuitry. For electrical devices that experience high current surges, are unable to tolerate voltage drops, and are charged from the battery pack charger jack, the battery protection circuit is placed between the charger jack and the battery pack. For electrical devices that experience low current surges, and are charged from the battery pack terminals and/or charger jack, the protection circuit is placed between the battery pack terminals and/or charger jack, and the battery pack.

It is a further object of the invention to provide an improved rechargeable battery pack wherein all components, including short circuit and overload protecting elements, are disposed within the space envelope required by a non-protected battery pack so that the size and shape of the protected battery pack are the same as for a non-protected pack, and so that the protected pack may be substituted for a non-protected pack without requiring alteration of either the user device or the battery charging station.

Briefly described, a rechargeable battery pack in accordance with the invention has an electrical circuit including a battery array of one or more rechargeable batteries which may be connected conventionally in series or in parallel, a charging plug having positive and negative leads connected across the battery array, and a thermostat switch and a positive temperature coefficient resistor (PTCR) in series between the battery array and one of the charging leads. Preferably, all components, which may include one or more molded end caps, are held in the desired relationship within a suitable jig, electrically connected, and then wrapped with a suitable heat-shrinkable polymer film and heat treated to provide a rugged, inexpensive, rechargeable battery pack. Preferably, the thermostat and PTCR are disposed in a longitudinal void formed by the nip of adjacent cylindrical batteries in the pack so that the finished pack has substantially the same size and shape as a non-protected pack for the same application.

The foregoing and other objects, features, and advantages of the invention, as well as presently preferred embodiments thereof, will become more apparent from a reading of the following description in connection with the accompanying drawings in which.

Figures 1, 2:
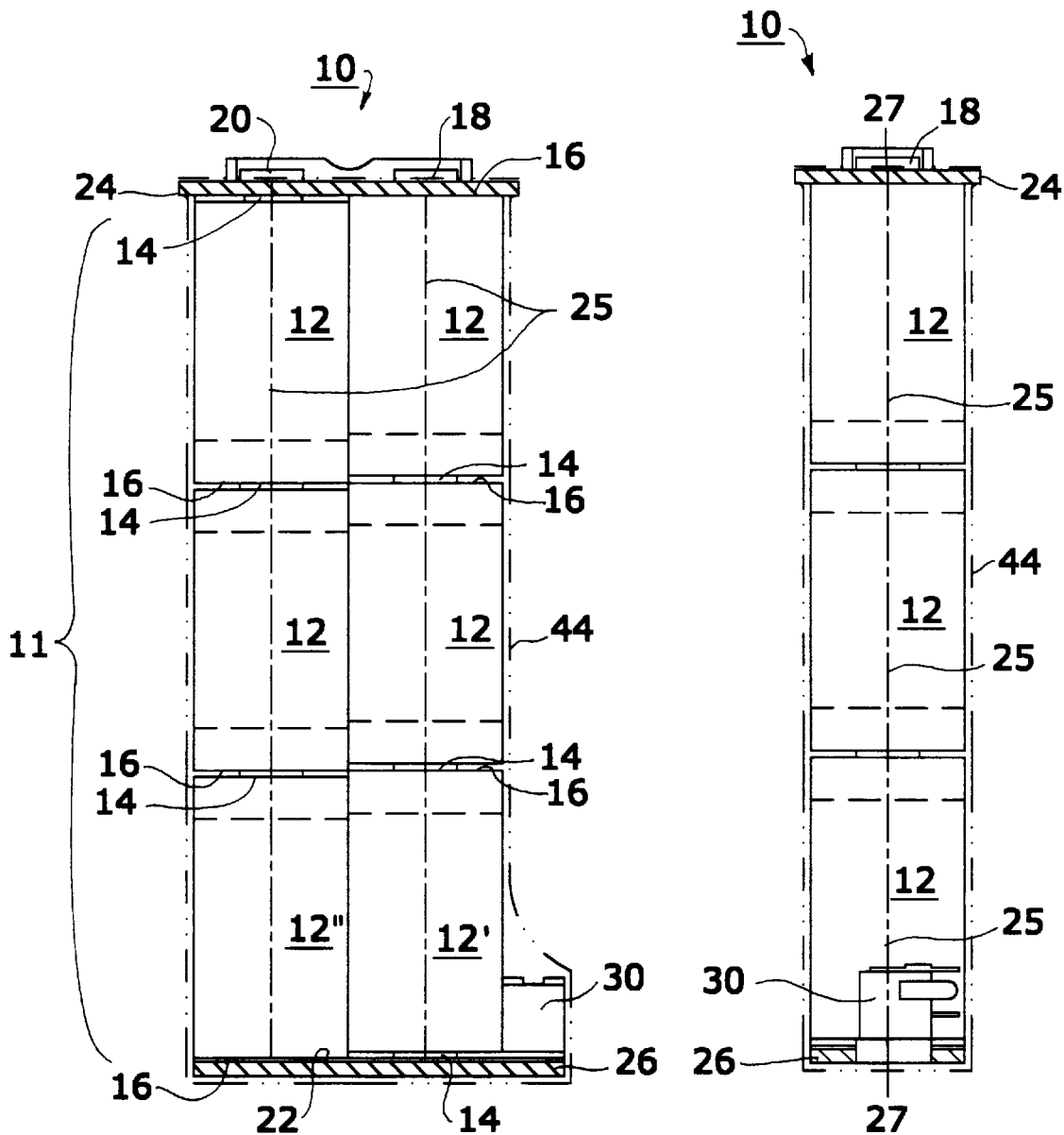
FIG. 1 is a front elevational view of a rechargeable battery pack, partially in cross-section, in accordance with the invention.
FIG. 2 is a right side elevational view, partially in cross-section, of the battery pack shown in FIG. 1.
Figure 3:
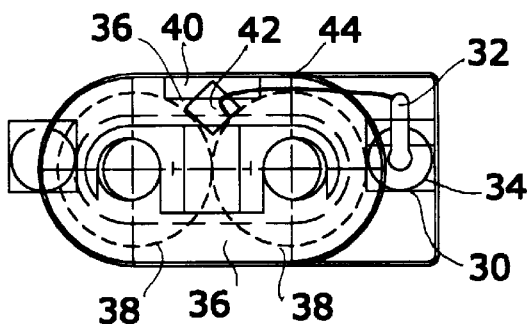
FIG. 3 is plan view of the battery pack shown in FIG. 1.
Figure 4:
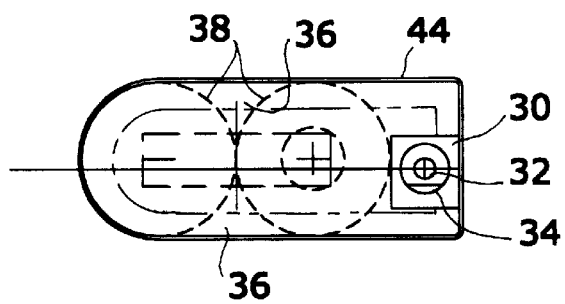
FIG. 4 is a bottom view of the battery pack shown in FIG. 1.
Figure 5:
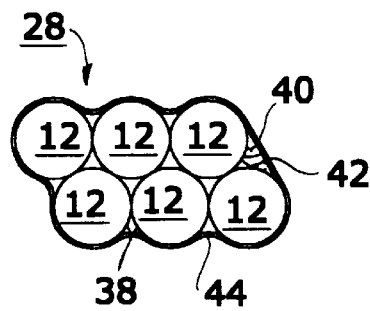
FIG. 5 is a simplified cross-sectional view of another embodiment of a rechargeable battery pack in accordance with the invention.
Figure 6:
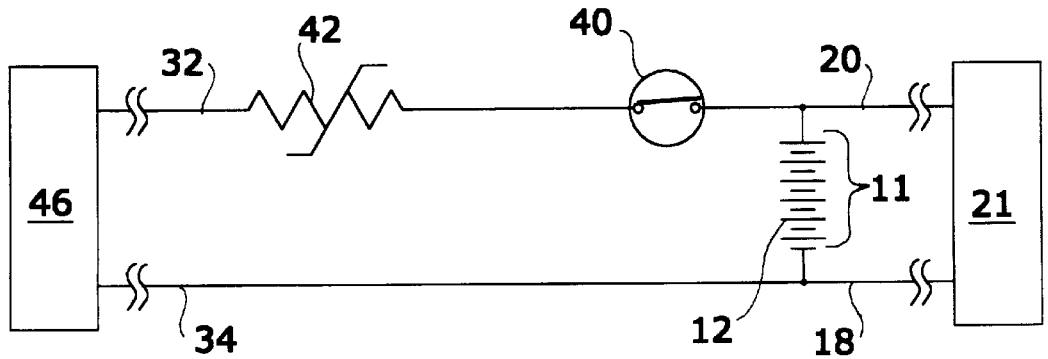
FIG. 6 is a schematic wiring diagram of a rechargeable battery pack in accordance with the invention.

Referring to FIGS. 1–4 and 6, there is shown a rechargeable battery pack 10 in accordance with the invention. Pack 10 includes an array 11 of six rechargeable batteries 12, for example, 1800 MAH fast charge NiCad batteries such as Energizer No. ECF-1800CS, available from Eveready Battery Co., Inc., Cleveland, Ohio, USA, each having a conventional central positive terminal 14 and negative base 16, the six batteries being connected in series between the negative post 18 and the positive post 20 of pack 10 for contact with mating terminals in electrically-powered device 21. A conductive strap 22 connects the third 12' and fourth 12" batteries at the lower end of the pack. A top insulator 24, protects posts 18 and 20 from inadvertent short circuit or physical damage. A bottom insulator 26 protects strap 22 and the lower ends of the third and fourth batteries and provides support for a jack to be described further hereinbelow. Batteries 12 in this embodiment are disposed in a planar arrangement wherein the axes 25 of all six batteries are included in a single plane 27, although any other convenient physical arrangement may be selected to meet the configurational requirements of a user device, for example, the arrangement shown in a second embodiment 28 shown in FIG. 5 wherein all batteries are disposed between and orthogonal to a pair of parallel planes.

Along the side of battery 12' near the lower end thereof and supported by bottom insulator 26 is disposed a coaxial DC power jack 30, for example, Part No. DJ005B available from LZR Electronics, Inc., Gaithersburg, Md., USA. Jack 30 has a conventional central terminal 32, normally positive, and a cylindrical outer terminal 34, normally negative, and is oriented with the opening downwards. Jack 30 is wired across battery array 11 to provide electricity thereto.

The pack as described thus far is known in the art of rechargeable power supplies and occupies an envelope in space defined by its outer dimensions.

Where the cases 38 of cylindrical batteries 12 touch, a pair of longitudinal trianguloid channels 36 are formed along the battery cases 38. Disposed in one of such channels are protective elements in accordance with the invention, so that the space envelope of the protected battery pack is substantially the same as for a non-protected pack, and so that the protected pack may be substituted for a non-protected pack without requiring alteration of either the user device or the battery charging station. Wired in series between one of the jack terminals 32,34 and one of the pack terminals 14,16 are a thermostatic switch 40, for example, PEPI, N-1, available from Portage Electric Products, Inc., North Canton, Ohio, USA, and a positive temperature coefficient resistor 42, for example, a PolySwitch RUE250, available from Raychem Corporation, PolySwitch Division, Menlo Park, Calif., USA. The battery assembly with the charging jack and protective elements in place is covered with a plastic shell 44.

In assembly of pack 10 from its components, batteries 12 preferably are held in an appropriate conventional jig (not shown) to form array 11 and thereafter are glued together along their touching sides. The pack terminals 14,16, insulators 24,26, strap 22, jack 30, thermostat 40, and PTCR 42 are arranged in the jig, being electrically connected as described hereinabove, the jig covering the outer ends of terminals 14 and 16 and jack 30, and the thermostat and PTCR being disposed in channel 36. Thereafter, the entire assembly is covered with a durable shell 44 as by dipping it in a cross-linkable or other resin, or injection moulding a plastic shell around it, or preferably and most economically by wrapping it with a heat-shrinkable polymer film such as polystyrene and thereafter applying heat in known fashion.

In operation, pack 10 is charged with electricity from a charging station 46 through both thermostat 40 and PTCR 42 and discharges electricity to a user device 21. In the event the temperature within the pack exceeds a preset level above which damage to the pack may occur, for example 70° C. for the PEPI N-1 thermostat cited hereinabove, the thermostat opens to break the circuit. When lower temperature conditions have been regained, the switch spontaneously closes to re-establish electrical continuity.

In the event the pack is subjected to a sudden, intense discharge, such as by a short circuiting of jack terminals 32 and 34, high current flowing through PTCR 42 induces a large, abrupt change in resistance. The normal resistance of the PTCR is on the order of tens of milliohms. When the PTCR is overloaded, this resistance increases by several orders of magnitude, limiting further current flow to several milliamps. After switching, the PTCR is latched into its high-resistance, protective state by the small, sustained, self-heating current, preventing continuous cycling which could damage the pack. The PTCR resets itself almost immediately when the electrical overload is removed.

From the foregoing description it will be apparent that there has been provided an improved rechargeable battery pack, wherein components and users of the pack are protected by thermal and electrical overload devices integral to the pack, and wherein such devices are included without changing the size and shape of the pack relative to a non-protected rechargeable pack. Variations and modifications of the herein described battery pack, in accordance with the invention, will undoubtedly suggest themselves to those skilled in this art. Accordingly, the foregoing description should be taken as illustrative and not in a limiting sense.

What is claimed is:

1. A battery pack having at least one battery with posts connectable to and for powering an electrically-powered device comprising:
    (a) A jack for connecting a source of power for charging said battery while powering said device, said jack having terminals connected across said battery and said device;
    (b) a positive thermal co-efficient resistor connected between one terminal of said jack and one of said posts in series with said battery; and
    (c) a thermal overload switch connected in series with said resistor between said one terminal and said one post, whereby to protect said battery against discharge by short circuit between the terminals of said jack.

2. A battery pack in accordance with claim 1 further comprising a plurality of batteries.

3. A battery pack in accordance with claim 2 further comprising at least one insulating end cap protecting said posts.

4. A battery pack in accordance with claim 2 wherein at least two of said batteries are cylindrical and are substantially in contact over at least a portion of their respective cylindrical surfaces to define a trianguloid channel and wherein series connected switch and said positive thermal coefficient resistor is disposed within said channel.

5. A battery pack in accordance with claim 4 wherein said pack is removable from said device.

6. A battery pack in accordance with claim 1 wherein said battery pack further comprises a plastic shell.

7. A battery pack in accordance with claim 6 wherein said shell includes a heat-shrinkable polymer.

8. A method for making a rechargeable battery pack, comprising the steps of:
    a) arranging at least one rechargeable battery, a charging jack, a thermal switch, and a positive thermal coefficient resistor in a configuration;
    b) electrically connecting said jack, resistor, switch, and battery in series; and
    c) forming a plastic shell around said configuration.

9. A method in accordance with claim 8 wherein said forming step includes the steps of:
    a) wrapping a heat-shrinkable polymer film around said configuration; and
    b) heating said film to shrink-wrap said configuration.

10. A method in accordance with claim 8 wherein said pack includes a plurality of cylindrical batteries having axes, said arranging step including the steps of:

a) forming a trianguloid channel in said pack by orienting at least two adjacent of said batteries so that their axes are substantially parallel and their sides are substantially touching along a contact nip; and b) disposing at least one of said switch and resistor in said channel.

11. A method for making a rechargeable battery pack having at least one rechargeable battery with post connectable to and for powering an electrically powered-device, said battery pack comprising:

(a) a jack for connecting a source of power for charging said battery while powering said device, said jack having terminals connected across said battery and said device;

(b) a positive thermal co-efficient resistor connected between one terminal of said jack and one of said posts in series with said battery; and (c) a thermal overload switch connected in series with said resistor between said one terminal and said one post, whereby to protect said battery against discharge by short circuit between the terminals of said jack, said method comprising the steps of:

(a) arranging said at least one rechargeable battery, said jack, said thermal switch, and said positive thermal co-efficient resistor in a configuration;

(b) electrically connecting said resistor in series with said switch between one of the terminals of said jack and one of said posts; and (c) forming a plastic shell around said configuration.

* * * * *